(12) United States Patent
Ramsden

(10) Patent No.: US 11,731,447 B2
(45) Date of Patent: Aug. 22, 2023

(54) DYE SUBLIMATION READY COATING FOR LOW TEMPERATURE PLASTIC SUBSTRATES

(71) Applicant: Conde Systems, Inc., Mobile, AL (US)

(72) Inventor: Paul Andrew Ramsden, Lewiston, ME (US)

(73) Assignee: Conde Systems, Inc., Mobile, AL (US)

( * ) Notice: Subject to any disclaimer, the term of this patent is extended or adjusted under 35 U.S.C. 154(b) by 0 days.

(21) Appl. No.: 17/701,249

(22) Filed: Mar. 22, 2022

(65) Prior Publication Data

US 2022/0212491 A1 Jul. 7, 2022

Related U.S. Application Data

(60) Division of application No. 16/290,915, filed on Mar. 3, 2019, now Pat. No. 11,305,570, which is a continuation-in-part of application No. 16/276,605, filed on Feb. 14, 2019, now abandoned, and a continuation-in-part of application No. 15/014,855, filed on Feb. 3, 2016, now Pat. No. 10,253,453.

(60) Provisional application No. 62/112,114, filed on Feb. 4, 2015, provisional application No. 62/112,119, filed on Feb. 4, 2015.

(51) Int. Cl.

| | | |
|---|---|---|
| *B41M 5/382* | (2006.01) | |
| *B41M 5/035* | (2006.01) | |
| *B41M 1/30* | (2006.01) | |
| *B41M 5/165* | (2006.01) | |
| *B41M 5/00* | (2006.01) | |
| *C08J 5/00* | (2006.01) | |
| *B41M 5/52* | (2006.01) | |
| *B41M 5/42* | (2006.01) | |

(52) U.S. Cl.
CPC ........ *B41M 5/38214* (2013.01); *B41M 1/30* (2013.01); *B41M 5/0011* (2013.01); *B41M 5/0355* (2013.01); *B41M 5/0356* (2013.01); *B41M 5/165* (2013.01); *B41M 5/38235* (2013.01); *C08J 5/00* (2013.01); *B41M 5/42* (2013.01); *B41M 5/5218* (2013.01); *B41M 2205/02* (2013.01)

(58) Field of Classification Search
CPC ............ B41M 5/38214; B41M 5/0011; B41M 5/0355; B41M 5/165; B41M 5/38235; B41M 5/42; B41M 5/5218; B41M 1/30; B41M 2205/02; C08J 5/00
See application file for complete search history.

(56) References Cited

U.S. PATENT DOCUMENTS

| | | | | |
|---|---|---|---|---|
| 4,507,349 A | * | 3/1985 | Fromson ............... | B42D 25/369 |
| | | | | 428/209 |
| 2008/0251581 A1 | * | 10/2008 | Faenza ................. | B42D 25/382 |
| | | | | 235/487 |
| 2010/0021740 A1 | * | 1/2010 | Tanaka .................... | B32B 27/20 |
| | | | | 428/480 |

FOREIGN PATENT DOCUMENTS

| | | | | | |
|---|---|---|---|---|---|
| WO | WO 2008/097895 | * | 8/2008 | ............... | B05D 5/06 |
| WO | WO 2011/116419 | * | 9/2011 | ............... | G02B 5/18 |

* cited by examiner

*Primary Examiner* — Amina S Khan
(74) *Attorney, Agent, or Firm* — The Gache Law Firm, P.C.; Russell C. Gache

(57) ABSTRACT

It is the object of the present invention to provide a new polymer coating for low temperature plastics and plastic foams that allows for the application of disperse dyes in a sublimation process that preserves the original properties of the underlying plastic substrate. The composition includes an optically clear synthetic organic polymer base holding two layers, a first reflective layer supported by the low temperature plastic substrate that includes IR radiation reflecting additives, and a second layer supported by the first layer having light scattering particulate additives. The disperse dyes utilized in the invention may include additives to absorb IR radiation provided by an external IR source positioned above the disperse dyes causing the dyes to sublimate and diffuse quickly into the light scattering layer. The combination of these layers allows for diffusion of the disperse dye ink into the light scattering layer while protecting the low temperature plastic below.

20 Claims, 4 Drawing Sheets

DYE SUBLIMATION READY COATING FOR LOW TEMPERATURE PLASTIC SUBSTRATES

FIELD OF THE INVENTION

The present invention relates generally to sublimation coatings. In particular, the present invention relates to dye sublimation transfer printing onto synthetic organic polymers using infrared activated disperse dyes.

BACKGROUND OF THE INVENTION

In the field of imprinting designs onto articles of manufacturer using disperse dyes, known commonly in the industry as dye-sublimation printing, images are transferred from a carrier medium using heat and pressure to activate printed dyes on the medium and causing them to turn into a gas or "sublimate" from their solid state and to diffuse into a softened polymer matrix. For example, an early patent disclosing a dye sublimation transfer was presented in U.S. Pat. No. 4,021,591 issued to Devries. Another sublimation example is shown in a method of imaging a ceramic mug as disclosed in U.S. Pat. No. 4,943,684 issued to Kramer.

Certain fibrous organic materials such as polyester fabric and certain synthetic organic polymers such as acetyl, polycarbonate, and nylon can accept the diffusion of sublimable or disperse dyes directly and have no need to be coated before receiving the image. However, their natural ability to accept the diffusion of the dye does not ensure long term persistence of these dyes and often the image will blur or fade over time. Moreover, softer substances such as plastics are resistant to the diffusion process of the disperse dyes because they cannot withstand the relatively high temperatures and pressures required to properly vaporize and impregnate disperse dyes through their molecular surface structure and into the underlying substrate.

For this reason, and to render articles suitable for dye sublimation decoration that is persistent and long-lasting, synthetic organic coatings are typically formulated and employed to pre-coat the substrate being decorated prior to the transfer of an image. An example patent disclosing such coatings used prior to the sublimation of images onto ceramic tiles is U.S. Pat. No. 4,174,250 issued to Durand.

Most disperse dyes are applied to articles using heat presses where a transfer paper holding disperse dyes is placed over the article and the heat press is brought down over the article to cause transfer of the disperse dyes from the transfer paper or "media," usually a sheet of some kind, holding the dyes in the pattern to be applied to the article. The press is applied for a preset time period to enable the disperse dyes to be vaporized and diffused into the underlying coating or directly into the substrate, depending upon the type of substrate onto which is being "imaged." Typical temperatures for such heat-based presses is between 325 degrees F. to 400 degrees F. with the application of pressures of between 10 and 40 PSI.

In addition to heat presses to sublimate disperse dyes onto manufactured articles, vacuum based systems also exist where articles having curved edges or shapes that do not present an entirely flat surface upon which a heat press may be lowered. For example, plates which generally have a concave surface may be placed inside of a machine where a vacuum film is drawn over the plate and the air evacuated around the plate in a sealed space surrounding the plate so that the film applies pressure over the transfer media holding the image against the plate. The chamber is closed, air evacuated, and heat applied with heating elements placed into the surrounding chamber which is usually made of some type of metal to conduct heat into the evacuated chamber. For example, LC Printing Machine Factory Ltd, located in Guangzhou City, Guangdong Province, China manufactures a model No. ST-210 3D Film Vacuum Sublimation Heat Press Machine. The machine includes a drawer that opens and into which 3-D articles may be placed. A vacuum film typically made of flexible silicon material is then drawn over the 3-D articles holding a transfer sheet and the draw pushed closed into the machine. Air is evacuated from the drawer, thereby pressing the vacuum film against the article pressing the transfer medium against the article, and heat applied. The machine heating elements are energized for a set duration to cause the transfer of the disperse dye onto the article. This type of dye-sublimation printing is referred to in the industry as "3-D sublimation printing." Another machine that has a similar operation, but having a more compact design is offered by Technotape International, located in The Netherlands, and is called a 3D Sublimation Oven. These "3D" sublimation printing machines exhibit similar temperatures and pressures to those used in heat-press based sublimation processes.

U.S. Pat. No. 6,998,005 to Magee discloses a proposed method for printing through a dye sublimation process on plastic sheets. Magee discloses the use of temperature controls to control the core temperature of the plastic sheets so as not to deform the plastic. While Magee claims to achieve satisfactory dye sublimation results on plastic applying temperatures of 200 degrees F. to 600 degrees F., those promises are only achieved with inversely proportional time expenditures of 5 to 10 minutes. The imaging time of 15 to 20 seconds mentioned in Col. 22, lines 55-67, have been debunked as false, or at least unsatisfactory for substantial image transfer in a dye sublimation process in a commercial setting because the image quality is so low. In any event, the process is unsatisfactory for low temperature plastics because the process is convection based. The Magee depicted enclosure is heated by an external heat source and the plastic substrate is exposed directly to the heat in the oven. Hence, in order to transfer disperse dyes to the surface of the plastic without melting it, the type of plastic must be empirically analyzed and the amount of heating time increased to as the melting point (i.e. the point at which the plastic destructively deforms) of the plastic substrate decreases. So, low temperature plastic substrates will require times of 10-15 minutes in order to diffuse a disperse dye image into a relatively low temperature plastic, such as 250 degrees F. This long "imaging" time is unsatisfactory in a commercial imaging operation. Magee concedes this when he refers to imaging times of between 3 and 15 minutes at Col. 22, lines 56-57. However, plastics in the 200-250 degree melting genre are in the 10-15 minute time portion of this stated range, and hence the reason Magee's process has been unsatisfactory for plastic image transfer in a commercial manufacturing setting.

Some in the industry have attempted to utilize disperse dyes that have a very low volatility in order to shorten the temperature and pressure required for sublimation of the disperse dyes, thereby potentially lowering the temperature at which plastics may be imaged with disperse dyes. However, low volatility disperse dyes have been found to be inadequate to obtain the type of color saturation and quality that consumers expect, such as achieved in an inkjet imaging process. Hence, standard disperse dyes utilized in a dye sublimation process are preferred because they produce vibrant, attractive images preferred by consumers.

Importantly, the dye sublimation printing process is effective only when the dye that is caused to convert to a gaseous state is contained, and forced against the substrate or substrate/coating combination into which it is intended to be applied. As is known, both heat and pressure are needed in order for the disperse dye to penetrate into the intended substrate/coating, with most dye sublimation processes taking several minutes for the disperse ink to fully penetrate and bond to the substrate/coating. The duration of applied heat causes the softening or "loosening" of the molecular bonds in the matrix comprising the substrate/coating and allows for penetration of the disperse dye into the matrix. This process is sometimes referred to as "activating" the substrate or coating over-laid upon the substrate. Hence, dye sublimation printing on suitable substrates take several minutes at a minimum to process each sublimated image, which hampers the speed of automated manufacturing of articles to be marked using a dye sublimation process and, generally, reduces its usefulness for marking manufactured goods.

In addition, one genre of substrates that is popular for marking with traditional inks, such with inks used in ink jet printers, is not currently marked using disperse dyes. That genre is low temperature plastics and plastic foams. Low temperature plastics and plastic (i.e. organic or carbon polymer based) foams are popular substrates for traditional marking processes because they are easily and cheaply manufactured, and are easily size formatted for a variety of applications. For example, "foam-board" can easily be cut to size to suit photo backing or photograph placements on poster size boards. Further, foams can be made in a variety of thicknesses and densities, thereby lending themselves to three-dimensional effects or three-dimensional space conforming, such as inside boxes or containers. For the purposes of this disclosure, Applicant hereby defines "low-temperature plastic" as any plastic substrate that unacceptable deforms or alters its state at or above 300 degrees F. and 12 PSI. For example, such types of plastic in a typical dye sublimation printing process like with the usage of a heat press would deform and be permanently and unacceptably altered if a dye sublimation image was attempted to be applied to such a plastic for 3-4 minutes at 325 degrees F. and 15 PSI pressure. Hence, with the exception of engineered high temperature polymers, like Nylon or Teflon, most plastics that have a glass transition temperature of about 300 degrees F. begin to soften and change shape at 12 PSI or greater and are unusable in modern dye sublimation based decorating processes The limitation for these substrates is that even when polymer coatings are applied as mentioned above the polymer coatings are not robust enough to protect the underlying plastic foam or plastic material, and the substrate breaks down or shrinks during the process—both responses leading to unacceptable alterations in the substrate material. For example, plastic foam substrates that breakdown and are not susceptible to sublimation marking include polystyrene foams, polymethacrylimide foam, polyvinylchloride foam, polyurethane foam, polypropylene foam, polyethylene foam, polyethylene-vinyl acetate foam, Nitrile rubber, Polychloroprene foam, and silicone foam. This group also includes non-foamed plastic bases for the above foams, such as Acrylonitrile Butadiene Styrene (ABS), HIPS plastic (i.e. rigid polystyrene), HDPE Plastic, PVC Plastic, PET Plastic, and PETG Plastic. Generally, all of these plastics will either deform or change chemically/structurally (e.g. shrink) when exposed to the above-mentioned typical sublimation temperatures and pressures.

Therefore, what is needed is an improved coating process, and a coating and dye combination, that allows for the application of disperse dyes in a dye sublimation process that will not unacceptably alter the underlying naturel substrate material, and which can be applied relatively quickly to such substrates. The process and composition should also be usable on low temperature plastics.

SUMMARY OF THE INVENTION

It is the object of the present invention to provide a new polymer coating for low temperature plastics and plastic foams that allows for the application of disperse dyes in a sublimation process that preserves the original properties of the underlying plastic substrate. The composition includes an optically clear synthetic organic polymer base holding two layers—a first reflective layer supported by the low temperature plastic substrate that include IR electromagnetic radiation reflecting additives, and a second layer supported by the first layer holding light scattering particulate additives. The disperse dyes utilized in the invention may include IR absorbing additives that cause the dyes to sublimate and diffuse quickly into the light scattering layer. The combination of these layers allows for diffusion of the disperse dye ink into the light scattering layer while protecting the low temperature plastic substrate below from being altered by the application of IR radiation directed from above a transfer layer holding disperse dyes.

Other features and objects and advantages of the present invention will become apparent from a reading of the following description as well as a study of the appended drawings.

BRIEF DESCRIPTION OF THE DRAWINGS

An invention incorporating the features of the invention is depicted in the attached drawings which form a portion of the disclosure and wherein.

DESCRIPTION OF THE PREFERRED EMBODIMENTS

Figure 1:
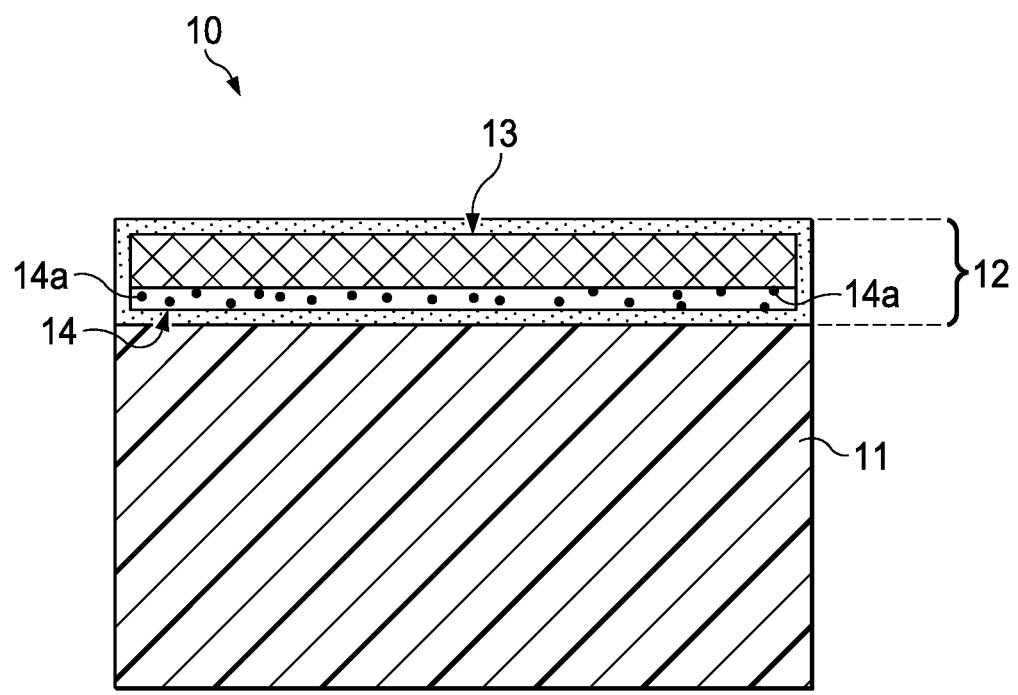
FIG. 1 is a cross sectional diagram of a coated plastic substrate.

Referring to the drawings for a better understanding of the function and structure of the invention, FIG. 1 shows a cross sectional view 10 of a plastic or plastic substrate 11 coated with a synthetic organic polymer 12 applied thereon, such as an organic binder and resin coupled with inorganic micro and nano-scale materials as will be described. For the purposes of this disclosure, "nano-scale" or "nano-sized" or "nano-particle" is herein defined as any particle having an average mean width of less than one-billionth of a meter, and "micro-scale" or "micro-sized" or "micro-particle" is herein defined as any particle having an average mean width of less than one-millionth of a meter.

Plastic substrate 11 may be formed of plastic or plastic foams from the following groups: polystyrene foams, polymethacrylimide (PMI) foam, polyvinylchloride foam, polyurethane foam, polypropylene foam, polyethylene foam, polyethylene-vinyl acetate foam, Nitrile rubber, Polychloroprene foam, silicone foam. This substrate group also includes non-foamed plastics for the above foams, such as Acrylonitrile Butadiene Styrene (ABS) plastic, HIPS plastic (i.e. rigid polystyrene), HDPE Plastic, PVC Plastic, PET Plastic, and PETG Plastic. The only critical property for the herein described coating and process to be successful is that the underlining plastic substrate 11 must be able to accept and hold without chemical degradation a synthetic organic polymer, such as an organic binder and resin. Given that limitation, the herein described coating will work with any plastic substrate of flat, that is, planar shape, even if the shape has irregular contours, and it may also be used on the surfaces of three-dimensional plastics. Further, as may be understood, while a flat plastic surface is depicted in the drawings, the herein disclosed coating may be applied to any surface texture of plastic, whether porous (i.e. open cell) or non-porous (i.e. closed cell), as long as the herein described coating can be applied to the surface and a disperse dye diffused into the coating. For example, a surface of expanded polystyrene foam or "EPS" may use the herein described coating and method to apply dispersed dyes on to its exterior. As may be also understood, EPS comes in varying shapes and sizes depending upon the mold from which it was formed.

Organic polymer 12 is a clear urethane coating and includes two layers 13 and 14. Layer 14 is a first layer supported by substrate 11 and includes micro-sized additives 14a that cause first layer 14 to exhibit reflective properties so that electromagnetic radiation is both attenuated and reflected back, away from the layer. To exhibit such reflective properties, the mean diameter size of the additives in layer 14 must be greater than 400 nano-meters.

Second layer 13 supported by the first layer 14 includes light scattering additives that renders it a white translucent, partially opaque coating. To effectively scatter visible light, the additives of second layer 13 must have a mean diameter size of less than 400 nano-meters. This second layer 13 is a layer of coating 12 that may be "activated" to accept a sublimated disperse dye upon the application of heat and pressure. For the purposes of this disclosure, the term "activated" means the non-destructive, temporary alteration of a material, such as a coating or a substrate, to allow the diffusion of a disperse dye into the molecular matrix structure of the material.

Obviously, coating layers 14 and 13 that make up coating 12 must be capable of bonding with the plastic substrate 11, and possess sufficient flexibility to allow the coated article to flex under nominal consumer usage. Given these requirements, suitable coating bases are acrylic or urethane, or a hybrid mixture of both, and in order to maintain flexible properties, the coating may be extruded directly onto the substrate or applied by conventional coating deposition procedures such as curtain deposition or a flow-over deposition (e.g. co-extrusion). The coating may be cured either by low temperature thermal activation, or the application of a chemical catalyst, which is preferred. Coating 12 ideally is not cured by photo-initiated or electron-beam initiated reaction because polymers cured in this manner generally do not possess the ability to be heated after curing without cracking or delamination.

As may be understood, the coating 12 is preferably applied by spraying each layer 13, 14 onto the plastic or plastic foam substrate 11 surface in a two-part process resulting in a dry film buildup of approximately 0.10 mm (0.004"). In the preferred embodiment, each layer 14 in coating 12 dries separately at room temperate with a catalyzed reaction to induce polymerization prior to applying layer 13 over it. However, the actual deposition method of coatings 13, 14 may vary, and the deposition and separation timing of each coating may be varied to achieve satisfactory coverage over the substrate as is known in the art. Some minor transition inter-mixing at the transition boundary between each layer will not significantly interfere with the objectives of the invention, however what is critical is that the insulating layer 14 must substantially separate substrate 11 from diffusion layer 13 so that substrate 11 is properly insulating and dye receiving layer 13 does not have its light scattering effects defeated by intrusion of the insulating additives of layer 14 into layer 13. Such undesirable intermixing will unacceptably alter the luminance of the dye image defused into layer 13 causing a "muddy" or an unacceptably dull image.

First layer 14 includes additives that cause the layer to exhibit insulating properties which protect the underlying substrate 11 from electromagnetic radiation. For the purposes of the process disclosed herein the type of electromagnetic radiation being blocked by layer 14 includes both infrared (IR) and ultraviolet (UV) spectrums, and incidentally the visible wavelength spectrum, however blockage of the visible and UV spectrum is incidental to the additive properties and not critical to the process, but nevertheless such blockage provides a protection barrier to the plastic substrate 11 after imaging. Further, as will be understood, IR energy sources to achieve the sublimation of disperse dyes may be tailored in these spectrums to magnify the sublimation of disperse dyes, depending upon the wavelengths created by energy emitters utilized and the type of disperse dyes utilized. However, it is critical that additives 14a within layer 14 have a size lager than 400 nano-meters in diameter so that ultraviolet and infrared energy will be blocked and fully attenuated at the upper boundary of the layer or within the layer such that substrate 11 is isolated from such IR energy.

Satisfactory reflecting and insulating based additives for layer 14 include micronized microspheres offered by 3M corporation, such as their S60 or IM16K microsphere additives, which are essentially micro-sized glass bubbles having a preferred particle size of between 30 and 50 microns in diameter and which have a white color, and a particle size of less than 40 microns when layer 14 is sprayed onto substrate 11. It is helpful, although not critical, that the utilized microsphere additives have a white color to avoid interference with the clarity of the upper, second light scattering layer 13 because white tends to magnify the light scattering effect and assists in the promotion of the disperse dye within the upper, second layer 13. To achieve such a superior white color such microspheres may be coated with a layer of micronized titanium dioxide ($TiO_2$) which inherently reflects light in a distributed white spectrum manner. In the herein described process and composition, micronized glass spheres (i.e. bubbles) are preferred because the air held inside each bubble provides an excellent insulator to protect substrate 11. However, many types of non-organic microspheres may be utilized as long as the microsphere exhibits a satisfactory amount of electromagnetic radiation reflectivity and insulating qualities to protect the substrate 11. For example, ceramic micronized microspheres would be satisfactory, and ceramic microspheres may also be coated with titanium dioxide to enhance light reflectivity as mentioned above. Loading levels for layer the additives of layer 14 should be less than 60% by volume and less than 40% weight of solids in order for the layer 14 to be satisfactorily applied to the substrate 11.

For second layer 13, a suitable light scattering pigment preferably incudes nano-sized particles of metal oxide, such as aluminum oxide, having an average particle size of 100 nm at a maxim loading level of 5%-10% by weight of solids, but even more preferably utilizes a particle size of approximately 5 nm maximum width with loading level of 20% by weight of solids. In order for a final decorated plastic article to exhibit the desired optical characteristics, the coating 13 must include particulate that is capable of scattering light as opposed to reflecting light. Suitable light scattering particulates include aluminum oxide, titanium dioxide, zirconium oxide, calcium carbonate, kaolin clay, ceramic nanoparticles, cerium oxide and other white appearance particulate. Importantly, each particulate must be less than 400 nm in size so that each is smaller than any visible wavelength of light. This results in the particulate having a higher refractive index than the clear coating that supports the particles, resulting in suitable light scattering. Also, the particulate should be white in color, and preferably assists in rendering layer 14 and thereby the plastic substrate more scratch resistance. In the preferred embodiment the particle additive for layer 13 is nano-particles of aluminum oxide. The loading level of the particulate should be sufficient to impart whiteness and a degree of opacity, but not of such concentrations that the coating ceases to be translucent or partially transparent. Therefore, nanoparticles in a range of 60 nm-200 nm at a loading level of between 10% and 30% by weight of solids of the coating 13 are suitable.

Coating thickness is also important. The coating 12 must be thick enough to allow the light attenuation and scattering effects caused by the particulate contained within each layer 13, 14 it to render the article impervious to limited exposure of electromagnetic radiation. This generally requires a coating thickness of at least 0.0015", but preferably greater than 0.0025" in thickness. The coating should not however be greater than 0.005" because as disperse dyes may fail to properly diffuse into the coating 13. The consequence of this is that the whiteness imparted by the particulate present between the acrylic interface and the threshold of the dye saturated part of the coating film of layer 13 may cause a hazing of the image held by the coating 12. Therefore, the optimal thickness of the coating 12 is between 0.003" and 0.0045".

Figure 2:
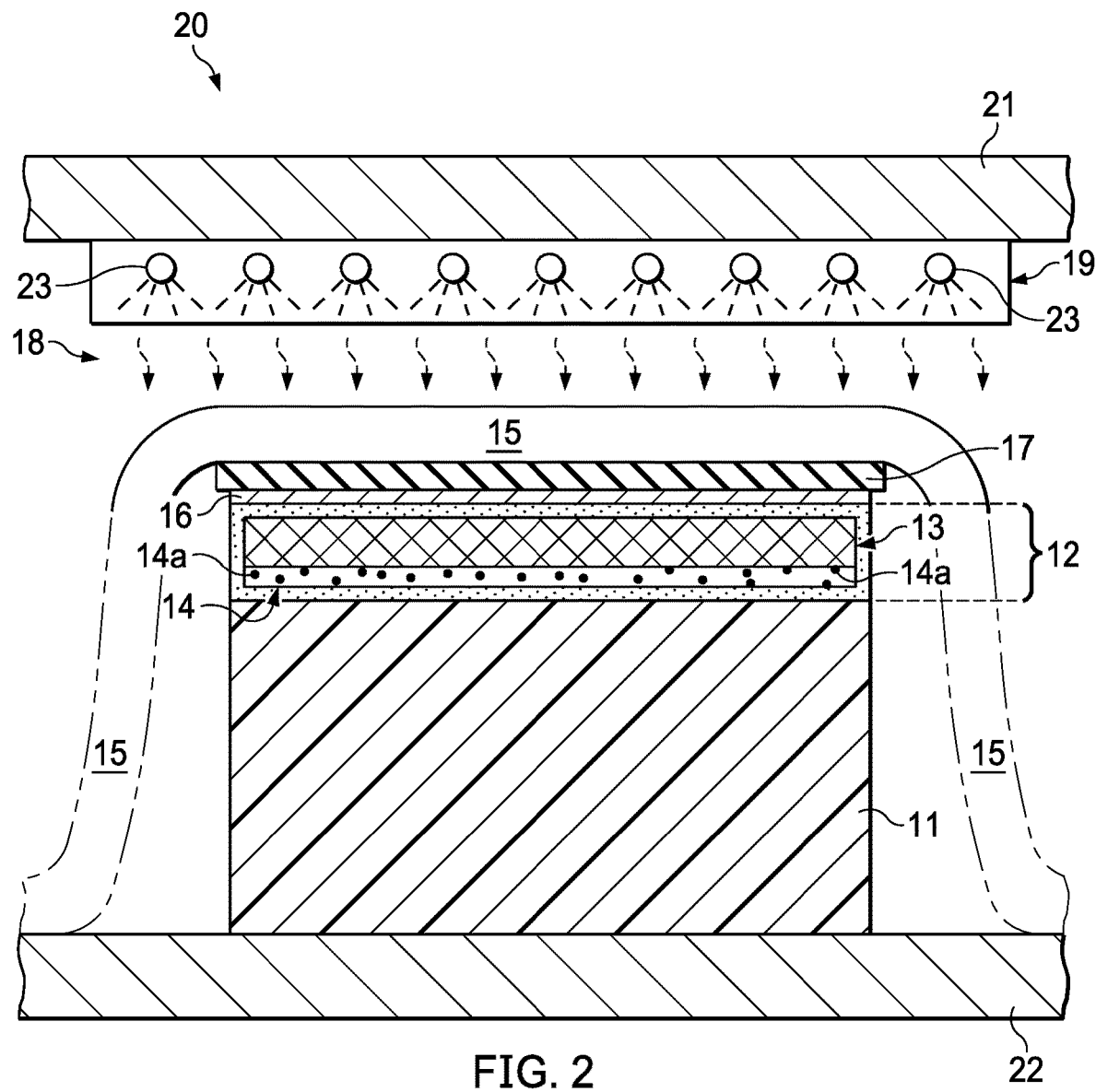
FIG. 2 is a cross sectional diagram of the coated plastic substrate shown in FIG. 1 positioned within a 3-D sublimation oven in the process of receiving a dye sublimation image from a transfer media.

Referring now to FIG. 2 is may be seen the coated plastic substrate piece 11 from FIG. 1 is now positioned in an arrangement 20 within a 3-D sublimation oven arranged to cause the transfer of a graphic image 16 from a printed transfer paper media 17. The layering from the top of the stack of elements depicted in this cross-sectional view includes a bank of heating elements 19 supported by a containment covering 21 heated to at least 365 degrees F., and a small gap through which the energy generated by the heating element 19 may radiate downward onto transfer paper 17. Transfer paper 17 holds image 16 printed thereon with disperse dyes that may be deposited via a suitable inkjet printer with paper 17 oriented with its print-side facing downward against the coated side 12 of the coated substrate 11 as described in FIG. 1. The substrate 11 is supported by a porous ceramic insulation layer 22 which prevents heat from dissipating into the bottom of the plastic substrate 11 while holding in the heat generated from heating elements 19. The ceramic insulation 22 furthermore allows for moisture of other gases to wick from the substrate 11 during the heating process. As may be understood, oven arrangement 20 may include side walls (not shown) to contain the energy generated by elements 19, or may be open if arrangement 20 depicts a moving assembly line in which substrate 11 is moved from station to station within a factory.

As mentioned above, dye sublimation best occurs when both pressure and temperature cooperate together to force disperse dyes into a coating or substrate once sublimated. Hence, in addition to heating elements 19 a flexible membrane 15, such as a sheet made of silicone, vulcanized rubber, butyl rubber, and other high temperature elastomeric material, is applied to the upper surface of transfer sheet 17 which contains sublimated dye image 16 once activated. Essentially, the membrane 15 acts as a "pressure applicator" to apply pressure to the transfer sheet and dye held thereon. For the purposes of the herein described invention, a preferred membrane would be a very thin clear silicon sheet, non-permeable and flexible, preferably having a degree of stretch to conform to the surface of substrate 22 if the surface includes contours (i.e. a "3D" shape), and being capable of withstanding repeated operating temperatures of 300-400 degrees F. Importantly, the membrane 15 must exhibit a minimal absorption in the medium wave IR spectra, and ideally be reusable on multiple cycles. Hence, preferably, membrane 15 has a thickness of only 0.5 mm. In addition, membrane 15 is arranged to create an airtight seal against base 22 and through a vacuum orifice in membrane 15 air below it and surrounding substrate 11 may be evacuated to cause a strong negative pressure between membrane 15 and assembled layers 15, 16, 14, 13, 11, against base 22. A typical force of 15 PSI upon the aforementioned layers is easily attained through such evacuation process. Further discussion regarding the general use and operation of a 3-D dye sublimation oven shall be omitted in as much as it is not necessary for a complete understanding of the herein described invention. However, applicant directs the reader to U.S. Pat. No. 6,998,005 to Magee, which is hereby incorporated by reference in its entirety, and which explains the general operation and usage of vacuum presses using flexible membranes for dye sublimation printing on plastic sheets.

As shown in FIG. 2, once membrane 15 is pulled down over layers 15, 16, 14, 13, 11, against base 22, emitters 23 cause IR radiation to be emitted toward the combined and compressed layers. The IR radiation passes through membrane 15 and sublimates disperse dye 16. Due to the heat and pressure, image 16 held by transfer sheet 17 diffuses into upper layer 13 being held therein while layer 14 reflects or attenuates energy 18. This causes image 16 to be retained mostly in layer 13, but may allow some image dye to penetrate into substrate 11. The time to due this process is relatively fast for dye sublimation processes, such as 35-60 seconds, with a mean goal of about 45 seconds, and this is achieved without the substantial heating of plastic substrate 11 as will be further discussed.

Figure 3:
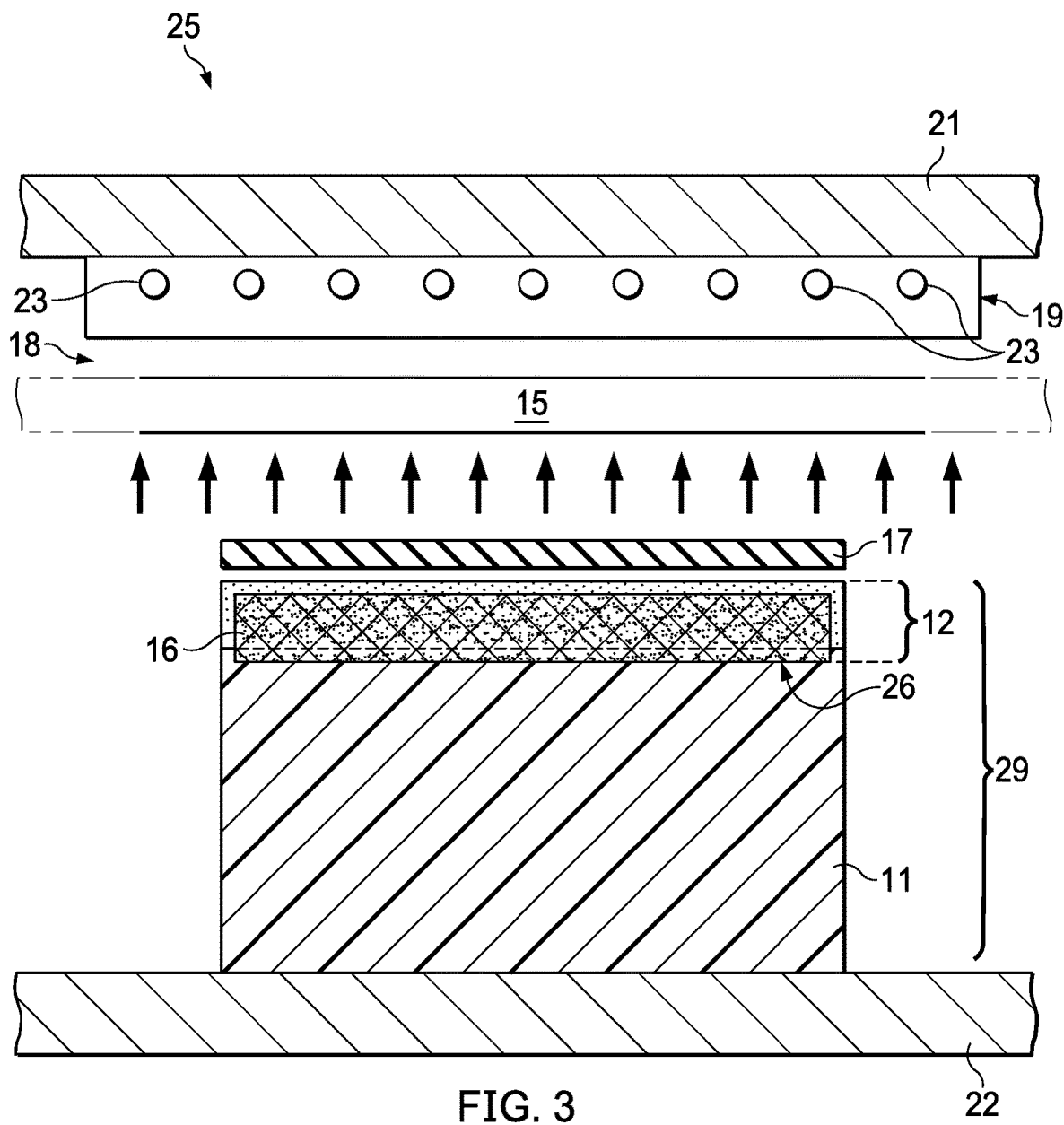
FIG. 3 is a cross sectional diagram of the coated plastic substrate shown in FIG. 2 after heat and pressure have caused the diffusion of the dye into the polymer coating without deforming the plastic substrate; and, FIG. 4 is a detailed cross section of the coating applied to the surface of the plastic substrate during the activation of the coating.

As shown in FIG. 3, disperse dyes 16 held by transfer paper 17 have turned into gases by a sublimation phase change process and have diffused into the receptive polymer coating 12 thoroughly until reaching the surface of substrate 11, with some limited penetration therein 26. Membrane 15 has also been lifted upwards and above sheet 17 and the vacuum removed. This occurs after the assembly has been subjected to 365 degrees F. for preferably 40-50 seconds under a pressure of approximately 15-45 PSI. However, the temperature applied using emitters 23 is relative to the type of membrane being used, the amount and type of IR absorbing properties in the disperse dye, and the types of transfer sheet holding the IR absorbing particles. Because the energy emitted by bank 19 will be contained within layers 17 and 12, the amount of IR energy needed is the equivalent energy received by a dye sublimation transfer sheet holding a disperse dye image in a conventional dye sublimation press that receives about 350 degrees F. heat, 15 PSI, and about 4 minutes in duration. However, with the exception of a pressure of 15 PSI which is required to contain and focus the diffusion of the dye into the coating, the actual energy required will be much less for the current invention because of the containment within the layers 12, 17 of the IR energy received and due to the focusing of the energy within the transfer sheet and dye receptive layer 13, as will be further discussed using FIG. 4. Hence, only enough energy is needed to cause activation of the disperse dyes in layer 17 and activation of receiving layer 13 to allow diffusion of dye into the matrix of layer 13. This process results in a decorated plastic article 29 that retains its original shape and texture, and has an image 16 left on its surface 12 with the potential for some diffusion of the image into the substrate itself 26.

Figure 4:
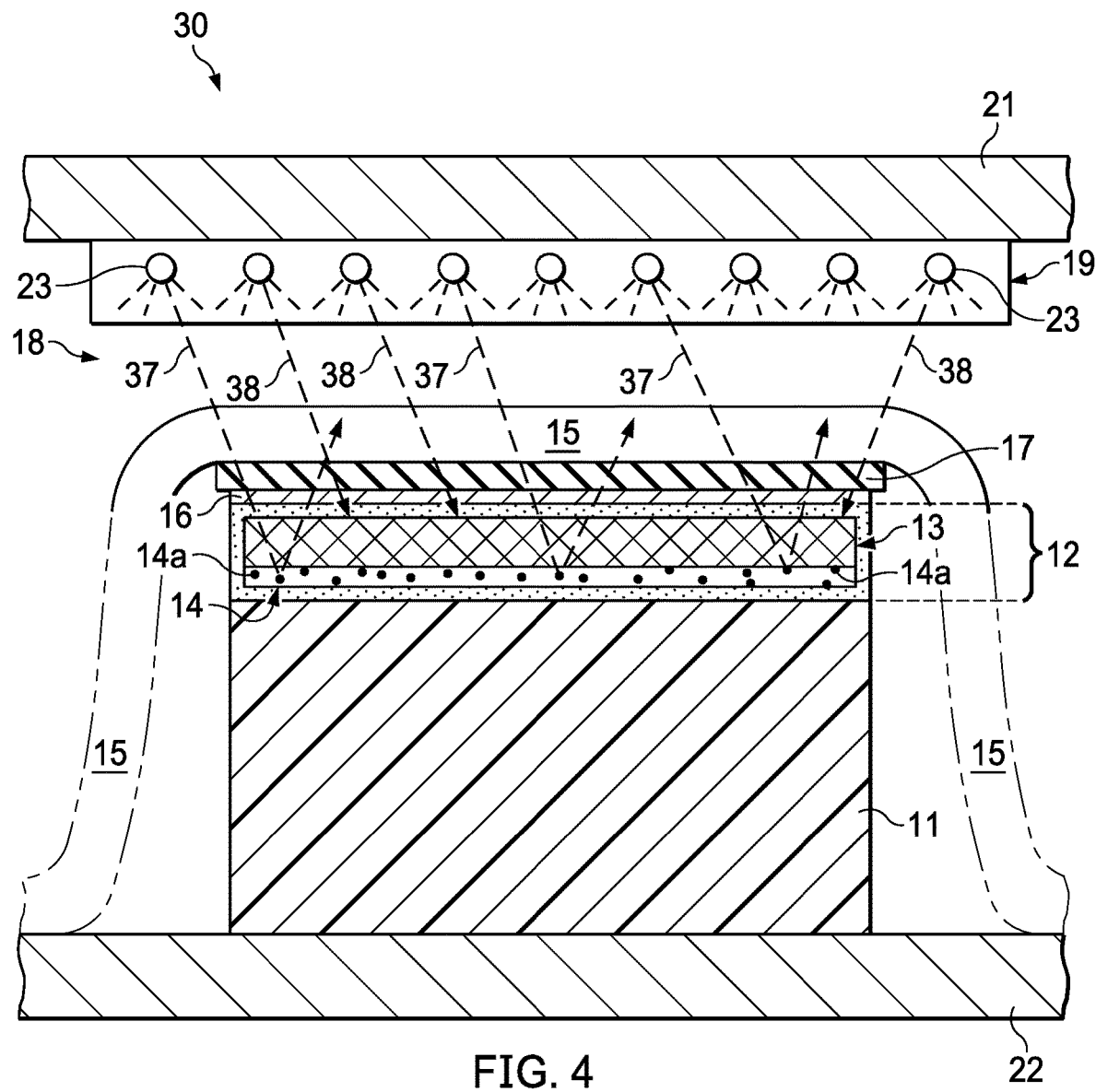

FIG. 4 shows the manner in which the dual layer coating 12 operates to promote diffusion of dye 16 into layer 13 while protecting substrate 11 with layer 14. Within oven arrangement 30, emitters 23 in bank 19 cause IR energy to be released, radiantly crossing over short gap 18. The preferred wavelength of IR energy emitted is medium IR wavelengths of 2-3.5 micro-meters because emitters causing energy with this wavelength are readily available in the industry. Membrane 15, now in a vacuum state such that its underlying surface is pressing on the upper surface of sheet 17 and over substrate 11 from above and its sides, is formulated to minimize attenuation of IR energy that passes through it to facilitate the conductive transfer of the IR energy and to activate disperse dyes 16 held by the underside of transfer sheet 17. Energy waves 37, 38 from emitters 23 strike dyes 16 and coating 12 from each emitter from all downward angles to ensure full envelopment of those waves on dye 16 and coating 12 in an overlapping and non-directionally specific manner. As may be seen, waves 37, 38 radiate through membrane 15 downwards, which allows for conduction of incident energy hitting layers 17 and 13, with a minimum of IR energy passing around or affecting substrate 11 through convection. Further, a portion of those waves 38 are absorbed by dyes 16 so that the dyes 16 are sublimated and forced downward in a gas state onto coating layer 13 due to the pressure and containment of membrane 15 pressing against substrate 11. Simultaneously, a portion of waves 37 pass through dyes 16 and strikes layer 13, thereby absorbing and attenuating the balance of energy from emitters 23 transiting through layer 13, but also activating layer 13 to allow absorption of dyes 16 into its molecular matrix. Any remaining waves 37 passing through layer 13 are reflected back by layer 14, thereby focusing the IR energy into layer 11. Any energy 37 that is not reflected by layers 14 is fully attenuated within it so that substrate 13 is unaffected by downward directed energy 37, 38, and is thereby isolated and preserved from the damaging effects of the IR energy.

As an enhancement to the above described process and composition dyes 16 may include additives formulated to absorb more IR energy from emitters 23. For example, disperse dyes may include gold or silver nano-sized particles that will absorb IR energy and more quickly concentrate IR energy within the dye 16. Preferably, dye 16 includes loading levels of 5%-10% IR absorbing particles by weight of solids to effectively boost heating dye 16. By including such absorbing additives in dye 16, the required amount of energy from emitters 23 is substantially reduced, thereby multiplying the reflective and attenuating effect of layer 14 to protect substrate 11. However, as may be understood, sufficient energy must still pass through dyes 16 and strike layer 13 such that layer 13, and indeed entire coating 12, is activated to allow sublimated dyes 16 to diffuse into and be held by coating 12, or at least layer 13. Hence, a balance must be maintained between the amount of dye present on transfer sheet 17, the amount and strength of absorption by the dye exhibits due to energy absorbing additives, and the amount of energy generated by emitters 23. This may be easily accomplished by varying energy source 19 using a rheostat or other electronic control to limit energy output of the emitters, as is known, to allow an empirical determination of the most effective balance of IR energy for a set loading level of IR absorbing additives in dye 16.

In an alternate embodiment, rather then the dye 16 holding IR energy absorbing additives, transfer sheet 17 may hold the additives in an IR absorbing coating to heat up sheet 17 and thereby dyes 16 during sublimation processing, but leave behind energy absorbing particles once dyes 16 are sublimated and diffused into layer 13. Such a described sheet 17 may be reusable so that an ink jet printer may re-image sheet 17 again and again after each process to transfer of dye image 16 onto a coated substrate 29.

In an even further embodiment, transfer sheet 17 may be removed and dye image 16 may be deposited directly onto membrane 15. Membrane 15 would need to be formulated, possible through a coating, to hold a dye image 16 directly thereon and yet allow for release of the dye image once sublimated, and would likely be considered to be disposable. Hence, membrane 15 holding image 16 may be extended and partitioned into multiple dye imaged sections on a continuous roll, and which may be advanced after each process to image a new substrate. In this manner, a continuous operation may be achieved in which an assembly line of substrates may be matched to and synchronized with movement of a membrane roll holding a plurality of images. Assuming a transition imaging time of approximately 50 seconds, dye sublimated images may be continuously applied to a large quantity of undecorated plastic articles to produce a scalable, decorated output of decorated articles in an efficient high-volume manner.

As may be understood, the layer 14 also provides protection from UV and IR energy long after the above described imprinting process. Additives present in layer 14 will continue to reflect such energies thereby protecting the underlying substrate 11 and any image that has been received by coating 12.

The industrial applicability of the present invention is broad. Products decorated in the manner described can be employed in commercial and residential wall photos, exterior promotional signage, table and desktop photographs contained in self-standing plastic substrates, plastic window murals and collages, cutting boards, plastic placemats, pre-fabricated POS counter areas, hanging ornaments, lighting fixtures, candle accessories, and an almost unlimited array of other plastic imprintables. The implication to photography itself is also significant as the invention provides for a completely different backing media for photographs that includes a full color spectrum of color including bright solid whites and rich blacks. Further, foam materials that previously resisted marking by dye sublimation techniques, may now be employed to permanently mark such materials in a manner that will resist fading and debasement. These marked materials may be especially useful in environments in which UV or IR energy is prevalent, such as at the beach or on a high elevation ski slope.

While I have shown my invention in one form, it will be obvious to those skilled in the art that it is not so limited but is susceptible of various changes and modifications without departing from the spirit thereof.

Having set forth the nature of the invention, what is claimed is:

1. A method of making a decorated low temperature plastic article, comprising
   a. applying a first organic polymer coating layer to the surface of a low-temperature plastic substrate having infrared radiation reflecting additives, said additives including particles having a mean diameter greater than 400 nano-meters;
   b. applying a translucent second organic polymer coating layer over said first layer formulated to disperse visible light hitting said second layer and light being reflected from said first layer, wherein said second layer includes light scattering particles have a mean diameter size less than 400 nano-meters, and wherein said first organic polymer coating layer reflects infrared radiation into said second organic polymer coating layer and said second organic polymer coating layer absorbs said reflected radiation;
   c. placing a transfer sheet holding an image comprised of disperse dyes over said coated plastic article;
   d. positioning a means for exerting pressure of at least 12 PSI over said transfer sheet to compress said sheet against said coated plastic article;
   e. simultaneously while applying pressure to force said transfer sheet against said coated plastic article, exposing said transfer sheet from above to infrared radiation to cause said disperse dyes to turn into a gas and diffuse into said second coating layer such that said disperse dyes are infused into said second coating at a molecular level consistent with dye-diffusion; and,
   f. wherein said first coating layer insulates said plastic substrate from said step of exposing said coated plastic article to infrared radiation by reflecting said infrared radiation upwards and back towards said first coating layer such that said infrared radiation is concentrated within said disperse dye and said second layer; and wherein said low-temperature substrate does not deform resulting from said step of simultaneous applying pressure and infrared radiation to said first and second coating layers.

2. The method as recited in claim 1, wherein said pressure means comprises a flexible membrane and said step of applying pressure comprises creating a vacuum under said flexible membrane thereby causing it to press against the upper surface of said transfer sheet.

3. The method as recited in claim 2, wherein said step of applying pressure and infrared radiation to cause diffusion of said disperse dyes into said second coating layer is completed in less than 60 seconds and the composition and shape of said plastic substrate is unaltered after said diffusion step.

4. The method as recited in claim 3, wherein said step of applying infrared radiation comprises the step of activating a bank of infrared emitters positioned above said pressure means.

5. The method as recited in claim 4, wherein said plastic substrate has a 3D shape and said flexible membrane is configured to stretch and substantially conform to the upper surface of said plastic substrate during said step of applying pressure and radiation.

6. The method as recited in claim 1, wherein said transfer sheet is formulated to absorb and heat up upon the incidence of said infrared energy upon its surface to cause the rapid transition of said disperse dyes from a solid to a gas held by said sheet.

7. The method as recited in claim 6, further including the step of formulating said disperse dyes held by said transfer sheet to absorb said infrared radiation.

8. The method as recited in claim 1, wherein said pressure means holds said image comprised of disperse dyes instead of said transfer sheet and said step of applying pressure and radiation causes said disperse dyes to diffuse into said second coating directly from said membrane.

9. The method as recited in claim 1, wherein said decorating method comprises the step of printing disperse dyes directly onto said second coating layer.

10. The method as recited in claim 1, wherein said step of simultaneously applying pressure and heat to said transfer sheet comprises the steps of:
    a. moving a continuous roll of transfer sheets, each sheet holding a disperse dye image and movable from a first position to a second position across a low-temperature plastic substrate; and
    b. applying said pressure and heat step to each transfer sheet as it moves from said first position to said second position above a new unprocessed low-temperature plastic substrate for the transfer of said image to said unprocessed substrate, and wherein movement of said continuous roll of transfer sheets is coordinated with movement of a waiting line of unprocessed low-temperature plastic substrates to form a continuous dye sublimation decorating line.

11. The method as recited in claim 10, wherein said pressure means comprises a flexible membrane and said step of applying pressure comprises creating a vacuum under said flexible membrane thereby causing it to press against the upper surface of said transfer sheet.

12. The method as recited in claim 11, wherein said step of applying infrared radiation comprises the activation of a bank of infrared emitters positioned above said pressure means.

13. A method of making a decorated low temperature plastic article, comprising
    a. applying a first organic polymer coating layer to the surface of a low-temperature plastic substrate having infrared radiation reflecting additives, said additives including particles having a mean diameter greater than 400 nano-meters;
    b. applying a translucent second organic polymer coating layer over said first layer formulated to disperse visible light hitting said second layer and light being reflected from said first layer, wherein said second layer includes light scattering particles have a mean diameter size less than 400 nano-meters;
    c. placing a transfer sheet holding an image comprised of disperse dyes over said coated plastic article;
    d. causing said transfer sheet to compress against said coated plastic article;
    e. simultaneously while compressing said transfer sheet against said coated plastic article, exposing said transfer sheet to a heat source so that said disperse dyes are infused into said second coating at a molecular level consistent with dye-diffusion; and,
    f. wherein said first coating layer insulates said plastic substrate from said step of exposing said coated plastic article to a heat source by reflecting said heat upwards and back towards said first coating layer, and wherein said reflected heat is absorbed by said second coating layer.

14. The method as recited in claim 13, wherein said compression step comprises creating a vacuum under a flexible membrane positioned over said transfer sheet and causing said membrane to press against the upper surface of said transfer sheet.

15. The method as recited in claim 14, wherein said step of simultaneous applying pressure and heat to cause diffusion of said disperse dyes into said second coating layer is completed in less than 60 seconds.

16. The method as recited in claim 13, wherein said transfer sheet is formulated to absorb and rapidly heat up upon the incidence of heat upon its surface thereby causing the rapid transition of said disperse dyes from a solid to a gas held by transfer said sheet.

17. The method as recited in claim 13, wherein said step of simultaneously applying pressure and heat to said transfer sheet comprises the steps of:
   a. moving a continuous roll of transfer sheets, each sheet holding a disperse dye image and movable from a first position to a second position across a low-temperature plastic substrate; and
   b. applying said compression and heat step to each transfer sheet as it moves from said first position to said second position above a new unprocessed low-temperature plastic substrate for the transfer of said image to said unprocessed substrate, and wherein movement of said continuous roll of transfer sheets is coordinated with movement of a waiting line of unprocessed low-temperature plastic substrates to form a continuous dye sublimation decorating line.

18. The method as recited in claim 17, wherein said decorating method comprises the step of printing disperse dyes directly onto said second coating layer.

19. The method as recited in claim 13, further including the step of formulating said disperse dyes held by said transfer sheet to absorb said heat.

20. A method of making a decorated low temperature plastic article, comprising
   a. applying a first organic polymer coating layer to the surface of a low-temperature plastic substrate having infrared radiation reflecting additives, said additives including particles having a mean diameter greater than 400 nano-meters;
   b. applying a translucent second organic polymer coating layer over said first layer formulated to disperse visible light hitting said second layer and light being reflected from said first layer, wherein said second layer includes light scattering particles have a mean diameter size less than 400 nano-meters;
   c. placing a transfer sheet holding an image comprised of disperse dyes over said coated plastic article;
   d. applying heat over said transfer sheet to force said disperse dyes into said first and second coatings on said plastic article; and,
   e. wherein said first coating layer insulates said plastic substrate from said step of exposing said coated plastic article to heat by reflecting said heat upwards and back towards said first coating layer, and wherein said reflected heat is absorbed by said second layer.

* * * * *